(12) United States Patent
Klein et al.

(10) Patent No.: US 8,796,345 B2
(45) Date of Patent: Aug. 5, 2014

(54) METHOD OF FORMING A POLYURETHANE MATERIAL WITH A METALLIZED POLYHEDRAL OLIGOMERIC SILSESQUIOXANE COMPOUND

(75) Inventors: Rene Alexander Klein, Hoegaarden (BE); Christina Marinus, Veltem-Beisem (BE); Chris Ian Lindsay, Tervuren (BE); Hendrikus Abbenhuis, Helmond (NL); Jos Wilting, Eindhoven (NL); Gijsbert Gerritsen, Eindhoven (NL)

(73) Assignee: Huntsman International LLC, The Woodlands, TX (US)

( * ) Notice: Subject to any disclaimer, the term of this patent is extended or adjusted under 35 U.S.C. 154(b) by 0 days.

(21) Appl. No.: 13/517,254

(22) PCT Filed: Dec. 8, 2010

(86) PCT No.: PCT/EP2010/069172
§ 371 (c)(1),
(2), (4) Date: Jun. 20, 2012

(87) PCT Pub. No.: WO2011/076570
PCT Pub. Date: Jun. 30, 2011

(65) Prior Publication Data
US 2012/0264840 A1 Oct. 18, 2012

(30) Foreign Application Priority Data
Dec. 21, 2009 (EP) .................................. 09180131

(51) Int. Cl.
C08G 18/22 (2006.01)
C08G 18/32 (2006.01)
C08G 18/38 (2006.01)
C08J 9/04 (2006.01)
C08K 5/54 (2006.01)

(52) U.S. Cl.
USPC ........... 521/111; 521/124; 521/154; 521/170; 528/28; 528/55; 528/56; 560/24; 560/25; 560/115; 560/157; 560/158

(58) Field of Classification Search
USPC ........ 521/111, 124, 154, 170; 528/28, 55, 56; 560/24, 25, 115, 157, 158
See application file for complete search history.

(56) References Cited

U.S. PATENT DOCUMENTS

| | | | | |
|---|---|---|---|---|
| 5,589,562 | A | * | 12/1996 | Lichtenhan et al. ............... 528/9 |
| 7,091,297 | B2 | * | 8/2006 | Mather et al. ..................... 528/28 |
| 7,524,914 | B2 | * | 4/2009 | Mather et al. ..................... 528/28 |
| 2005/0192364 | A1 | | 9/2005 | Lichtenhan et al. |
| 2008/0249275 | A1 | * | 10/2008 | Lichtenhan et al. ............... 528/9 |
| 2009/0082502 | A1 | * | 3/2009 | Lichtenhan et al. .......... 524/267 |
| 2009/0085011 | A1 | * | 4/2009 | Lichtenhan et al. .......... 252/478 |
| 2010/0125123 | A1 | * | 5/2010 | Lichtenhan et al. ........ 525/326.8 |
| 2011/0092661 | A1 | * | 4/2011 | Lichtenhan et al. ............. 528/30 |
| 2011/0318587 | A1 | * | 12/2011 | Lichtenhan et al. .......... 428/450 |

FOREIGN PATENT DOCUMENTS

| | | |
|---|---|---|
| WO | WO 2007/041344 A | 4/2007 |
| WO | WO 2008/144735 A | 11/2008 |
| WO | WO 2009/065873 A | 5/2009 |

OTHER PUBLICATIONS

W. Wang, J. S. Wiggins, "Kinetic Evaluation of Tin-POMS Catalyst for Urethane Reactions" *Journal of Applied Polymer Science*, 2008, 110, p. 3683-3689.
T. Maschmeyer et al., "Modelling the active sites of heterogeneous titanium-centered epoxidation catalysts with soluble silsesquioxane analogues" *Chemical Communications*, 1997, p. 1847-1848.
F. T. Edelmann et al., "Silsesquioxane Chemistry, 4. Silsesquioxane Complexes of Titanium(III) and Titanium(IV)" *Journal of Organometallic Chemistry*, 2001, 620 (1-2), p. 80-89.

(Continued)

*Primary Examiner* — Rabon Sergent
(74) *Attorney, Agent, or Firm* — Robert A. Diaz

(57) ABSTRACT

A method to form a urethane material, the method comprises blending and reacting at least one isocyanate, at least one isocyanate reactive compound and a metallized polyhedral oligomeric silsesquioxane to provide said urethane material, the metallized polyhedral oligomeric silsesquioxane is a dimeric structure with general formula

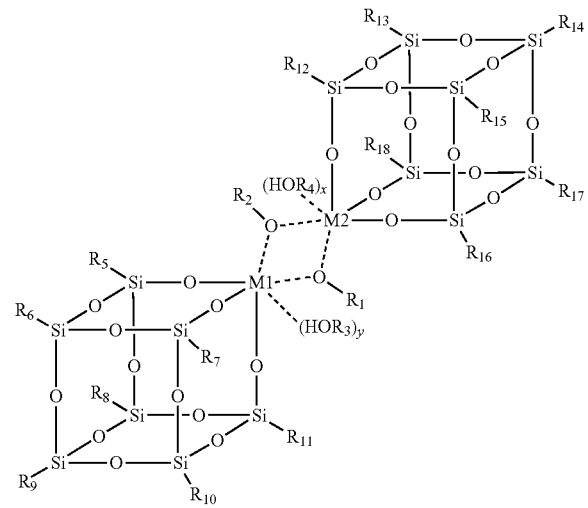

wherein
M represents a metal providing a 6-coordinated metal center, x and y being 1, $R_1O$ and $R_2O$ represent an alkoxide bridging the 6-coordinated metal centers, $R_3OH$ and $R_4OH$ represent an alcohol ligand and each of $R_5$ to $R_{18}$ is selected from the group consisting of alkyl-, polyether- and polyester ligands.

12 Claims, 6 Drawing Sheets

(56) References Cited

OTHER PUBLICATIONS

R. Duchateau et al., "Ethylene polymerization with dimeric zirconium and hafnium silsesquioxane complexes" *Organometallics*, 1998, 17, p. 5663-5673.

M. D. Jones et al., "Heterogeneous catalysts for the controlled ring-opening polymerization of *rac*-lactide and homogeneous silsesquioxane model complexes" *Dalton Trans.*, 2008, p. 3655-3657.

M. Crocker et al., "Synthesis and characterization of titanium silasesquioxane complexes : soluble models for the active site in titanium silicate epoxidation catalysts" *J. Chem. Soc., Dalton Trans.*, 1999, p. 3791-3804.

A. L. Spek, "Single-crystal structure validation with the program PLATON" *J. Appl. Cryst.*, 2003, 36, p. 7-13.

F. J. Feher et al., "Dimeric versus Monomeric Titanium(III) Siloxide Complexes, Synthesis and Characterization" *Inorg. Chem.*, 1998, 27, p. 3440-3442.

V. Lorenz et al., "Fully metalated silsesquioxanes : building blocks for the construction of catalyst models" *Angew. Chem., Int. Ed.*, 2004, 43, p. 4603-4606.

* cited by examiner

METHOD OF FORMING A POLYURETHANE MATERIAL WITH A METALLIZED POLYHEDRAL OLIGOMERIC SILSESQUIOXANE COMPOUND

CROSS-REFERENCE TO RELATED APPLICATIONS

This application is the National Phase of International Application PCT/EP2010/069172 filed Dec. 8, 2010 which designated the U.S. and which claims priority to European App. Serial No. 09180131.6 filed Dec. 21, 2009. The noted applications are incorporated herein by reference.

BACKGROUND OF THE INVENTION

1. Field of the Invention

The present invention relates to a method to form a polyurethane material, a reactive composition suitable to be used to provide a polyurethane material and the polyurethane material itself.

2. Background Information

Methods to produce polyurethane materials are well known at present. Various catalysts have been used to promote the gelling and optionally the blowing of the reactive materials in the blend of an isocyanate and an isocyanate reactive component. Various metallized polyhedral oligomeric silsesquioxane (referred to as POMS) are known as suitable catalysts for the urethane-bond providing reaction.

WO 2007/041344 mentions metallized nanostructured chemicals as cure promoters. Composite materials comprising polymers (including polyurethanes) and POMS, comprising Ti as metal are mentioned.

WO 2008/144735 discloses metallized polyhedral oligomeric silsesquioxanes, metalized using Ti or Zr, as catalyst as cure promoters for polyurethanes.

WO 2009/065873 discloses polyhedral oligomeric stanna silsesquioxanes as catalyst for polyurethane curing. The polyurethane may be used in coatings, lacquers, paintings, films and polymer compositions and increases the scratch resistance of coatings.

SUMMARY OF THE INVENTION

It has now surprisingly be found that the use of specific POMS enables to provide a method to form polyurethane material, which method allows to control the starting point of the reaction. The method makes use of a reactive composition which has a defined activation temperature.

Further, also a reactive composition, suitable to provide a polyurethane material, which reactive composition has a long potlife at ambient temperature was found. The reactive composition may be ready for use, i.e. does not need any addition of any component to induce the reaction of the components of the composition to provide the polyurethane material.

According to a first aspect of the present invention, a method to form a urethane material is provided. The method comprises the steps of:
- providing at least one isocyanate;
- providing at least one isocyanate reactive compound;
- providing a metallized polyhedral oligomeric silsesquioxane;
- blending and reacting the at least one isocyanate, at least one isocyanate reactive compound and the metallized polyhedral oligomeric silsesquioxane to provide the urethane material.

The metallized polyhedral oligomeric silsesquioxane is a dimeric structure with general formula (see also FIG. 1)

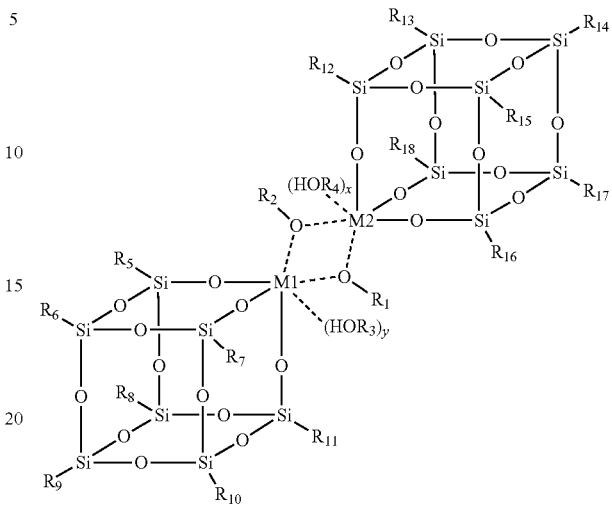

wherein
- M represents a metal providing a 6-coordinated metal center;
- x=1;
- y=1;
- $R_1O$ and $R_2O$ each independently represent an alkoxide bridging said 6-coordinated metal centers;
- $R_3OH$ and $R_4OH$ each independently represent an alcohol ligand
- Each of $R_5$, $R_6$, $R_7$, $R_8$, $R_9$, $R_{10}$, $R_{11}$, $R_{12}$, $R_{13}$, $R_{14}$, $R_{15}$, $R_{16}$, $R_{17}$, $R_{18}$ is selected from the group consisting of alkyl ligands.

Each of $R_1$ and $R_2$ may be an alkyl group, preferably a linear, branched or cyclic aliphatic group, preferably comprising 1 to 20 carbon atoms also referred to as a C1 to C20 group. More preferred each of said $R_1$ or $R_2$ is a C1 to C5 group, most preferred an i- or n-butyl group or an i- or n-propyl group.

Each of $R_3$ and $R_4$ may be selected from
- an alkyl group, preferably a linear, branched or cyclic aliphatic group, preferably comprising 1 to 20 also referred to as a C1 to C20 group. More preferred each of $R_3$ and $R_4$ is a C1 to C5 group, most preferred an i- or n-butyl group or an i- or n-propyl group;
- a polyether, preferably a polyether or
- a polyester, preferably a polyester.

Each of $R_5$ to $R_{18}$ may be selected from
- an alkyl group, preferably a linear, branched or cyclic aliphatic group, preferably comprising 1 to 20 carbon atoms, also referred to as a C1 to C20 group, most preferred an i- or n-butyl group or an i- or n-propyl group. Such a group, coupled to a Si-atom in the POMS structure, is referred to as a ligand. $R_5$ to $R_{18}$ may all be different, or some of the ligands may be identical to each other, whereas not all these ligands are identical. Most preferred, $R_5$ to $R_{18}$ are identical.

According to some embodiments, the metallized polyhedral oligomeric silsesquioxane may be incorporated into an isocyanate reactive compound before blending the at least one isocyanate, at least one isocyanate reactive compound and the metallized polyhedral oligomeric silsesquioxane.

According to some embodiments, the blending of the at least one isocyanate, at least one isocyanate reactive compound and the metallized polyhedral oligomeric silsesquioxane may be done at a temperature between −10° C. and 25° C.

According to some embodiments, the blend of the at least one isocyanate, at least one isocyanate reactive compound and the metallized polyhedral oligomeric silsesquioxane may be brought to a temperature between 25° C. and 200° C. to initiate the reaction of the at least one isocyanate, at least one isocyanate reactive compound and the metallized polyhedral oligomeric silsesquioxane.

In the methods according to the present invention, the amount of potential harmful metals such as mercury and tin and/or the amount of potential odorous organic compounds such as amines, which are commonly used as polyurethane catalyst, may be partially or completely replaced by an environmentally benign metallized polyhedral oligomeric silsesquioxane catalyst (also referred to as POMS).

Without wishing to be bound by any theory, it is believed that the presence of the additional ligands causes the POMS catalyst to become active at increased temperatures, whereas at ambient temperature, the catalytic activity is so insignificant that a reaction of the isocyanate or isocyanates and the isocyanate reactive compound or compounds does hardly occur. On the other hand, when the temperature of the blend of the isocyanate or isocyanates, the isocyanate reactive compound or compounds and the POMS is increased to a temperature above a given threshold temperature, the activity of the POMS catalyst increases suddenly. This threshold temperature seems to be dependent on the type of POMS and the type of alcohols used as ligands.

As a consequence, the reaction rate may be tuned by selecting (an) appropriate isocyanate(s), one or more isocyanate reactive compounds, a POMS catalyst, including the selection of the ligands being part of the POMS, and combining these compounds with processing parameters such as temperature.

The POMS is selected preferably such that the increased reactivity occurs between preferably 25° C. and 200° C., more preferably between 40° C. and 200° C., even more preferably 60° C. and 200° C. and most preferably between 80° C. and 200° C.

The POMS is selected preferably such that substantially no reactivity occurs between −10° C. and 25° C. or between −10° C. and 20° C.

The POMS catalysts used in the method according to this invention are hydrolytically very stable in comparison to other organometallic complexes. This leads to a high storage stability and the catalyst can be stored for at least 12 months with very limited, or even without deterioration of the catalyst activity.

The POMS catalysts used in the method according to this invention are in general very compatible with the isocyanate or isocyanates and/or the isocyanate reactive compound or compounds. In general, they are that compatible such that the use of a solvent to bring the POMS in the isocyanate or isocyanates and/or the isocyanate reactive compound or compounds can be avoided, leading to a low VOC catalyst system.

Suitable isocyanate are polyisocyanates. Polyisocyanate components are polyisocyanates of the type R—(NCO)$_x$ with x at least 2 and R being an aromatic or aliphatic group, such as diphenylmethane, toluene, dicyclohexylmethane, hexamethylene, or a similar polyisocyanate.

Suitable isocyanates may comprise one or more polyisocyanates, including but not limited to polyisocyanates selected from the group consisting of toluene diisocyanates (TDI), diphenylmethane diisocyanate (MDI)-type isocyanates, and prepolymers of these isocyanates. Preferably the polyisocyanate components may have at least two aromatic rings in its structure, and are liquid products. Polymeric isocyanates having a functionality greater than 2 may be used.

Examples of suitable polyisocyanates are tolylene diisocyanate (also known as toluene diisocyanate, and referred to as TDI), such as 2,4 TDI and 2,6 TDI in any suitable isomer mixture, hexamethylene diisocyanate (HMDI or HDI), isophorone diisocyanate (IPDI), butylene diisocyanate, trimethylhexamethylene diisocyanate, di(isocyanatocyclohexyl) methane, e.g. 4,4'-diisocyanatodicyclohexylmethane (H$_{12}$MDI), isocyanatomethyl-1,8-octane diisocyanate and tetramethylxylene diisocyanate (TMXDI), 1,5-naphthalenediisocyanate (NDI), p-phenylenediisocyanate (PPDI), 1,4-cyclohexanediisocyanate (CDI), tolidine diisocyanate (TODI), any suitable mixture of these polyisocyanates, and any suitable mixture of one or more of these polyisocyanates with MDI in the form of its 2,4'-, 2,2'- and 4,4'-isomers and mixtures thereof (also referred to as pure MDI), the mixtures of diphenylmethane diisocyanates (MDI) and oligomers thereof (known in the art as "crude" or polymeric MDI), and reaction products of polyisocyanates (e.g. polyisocyanates as set out above, and preferably MDI-based polyisocyanates), with components containing isocyanate-reactive hydrogen atoms forming polymeric polyisocyanates or so-called prepolymers.

Preferably toluene diisocyanates (TDI), diphenylmethane diisocyanate (MDI)-type isocyanates, and prepolymers of these isocyanates are used.

Isocyanate reactive compound may be alcohols, e.g. polyols such as glycols or even relatively high molecular weight polyether polyols and polyester polyols, mercaptans, carboxylic acids such as polybasic acids, amines, polyamines, components comprising at least one alcohol group and at least one amine group, such as polyaminepolyols, urea and amides.

Turning to the POMS suitable for use in the method according to the present invention, the metal M providing the 6-coordinated metal centers may be Ti or Zr, but Zr is preferred.

In the POMS used in a method according to the first aspect of the present invention, R$_1$O and R$_2$O each independently represent an alkoxide bridging said 6-coordinated metal centers. R$_1$O and R$_2$O are preferably identical.

In the POMS used in a method according to the first aspect of the present invention, R$_3$OH and R$_4$OH each independently represent an alcohol ligand. R$_3$OH and R$_4$OH are preferably identical.

The most preferred POMS used in a method according to the first aspect of the present invention, comprises two Zr metals, and R$_1$, R$_2$, R$_3$ and R$_4$ being n-butyl groups.

According to some embodiments, a polyurethane material may be provided.

According to some embodiments, at least one gelling catalyst may be provided to the blend of at least one isocyanate, at least one isocyanate reactive compound and the metallized polyhedral oligomeric silsesquioxane.

The POMS used in a method according to the first aspect of the present invention can be used in combination with one or more gelling catalysts without antagonistic effect.

Any catalyst suitable to be used as gelling catalyst in the production of a polyurethane material may be used. Most preferred, a combination of the POMS used in a method according to the first aspect of the present invention with a gelling catalyst known to those skilled in the art According to some embodiments, at least one blowing catalyst may be provided to the blend of at least one isocyanate, at least one isocyanate reactive compound and the metallized polyhedral oligomeric silsesquioxane.

The POMS used in a method according to the first aspect of the present invention can be used in combination with one or more blowing catalysts without antagonistic effect.

Any catalyst suitable to be used as blowing catalyst in the production of a polyurethane material may be used. Most preferred, a combination of the POMS used in a method according to the first aspect of the present invention with a blowing catalyst known to those skilled in the art.

It is understood that a combination of the POMS used in a method according to the first aspect of the present invention may be combined with one or more gelling catalysts and one or more blowing catalysts.

It is also understood that the blend of the at least one isocyanate, at least one isocyanate reactive compound and the metallized polyhedral oligomeric silsesquioxane used in a method according to the first aspect of the present invention may further be provided with additional components such as solvents, e.g. toluene, fire retarders, antioxidants, surfactants, physical or chemical blowing agents, fillers, pigments, or any other typical additives used in polyurethane materials.

According to some embodiments, the concentration of the metallized polyhedral oligomeric silsesquioxane in the blend of the at least one isocyanate, at least one isocyanate reactive compound and the metallized polyhedral oligomeric silsesquioxane may be less than or equal to 10 mM.

The concentration of POMS expressed in mM is to be understood as millimolar, being the amount of millimole of POMS per liter of the said reactive mixture.

More preferred, the concentration of the POMS is less than or equal to 5 mM, even more preferred less than or equal to 1 mM, even less than or equal to 0.5 mM.

According to a second aspect of the present invention, a reactive composition is provided.

The reactive composition comprises
at least one isocyanate;
at least one isocyanate reactive compound;
a metallized polyhedral oligomeric silsesquioxane being a dimeric structure with general formula (see also FIG. 1)

wherein
M represents a metal providing a 6-coordinated metal center;
x=1;
y=1;
$R_1O$ and $R_2O$ each independently represent an alkoxide bridging said 6-coordinated metal centers;
$R_3OH$ and $R_4OH$ each independently represent an alcohol ligand
Each of $R_5$, $R_6$, $R_7$, $R_8$, $R_9$, $R_{10}$, $R_{11}$, $R_{12}$, $R_{13}$, $R_{14}$, $R_{15}$, $R_{16}$, $R_{17}$, $R_{18}$ is selected from the group consisting of alkyl ligands It is clear that features of the metals, alcohol ligands, alkoxides, and any other feature as set out in relation to the method according to the first aspect of the present invention, applies to the reactive composition according to the second aspect of the present invention in a similar, optionally even an identical way. According to some embodiments, the metal may be zirkonium.

Since the POMS catalysts used in the composition according to the second aspect of the present invention are hydrolytically more stable than organometallic catalyst, a potentially long storage stability and maintained reactivity is provided to the reactive composition according to this second aspect of the invention. In particular, a reactive composition with a long potlife and geltime at temperature below 25° C. may be obtained.

As such, the reactive composition may be more easily transported and may be provided as a fit-for-use composition to producers of urethane materials, typically polyurethane materials.

According to a third aspect of the present invention, a polyurethane material is provided. The polyurethane material is obtainable by one of the methods according to the first aspect of the present invention.

The reactive composition according to the first aspect of the present invention may be used to provide a polyurethane material A polyurethane material according to the present invention may have a low VOC compared to polyurethane materials made by known amine catalyst, in particular using non-reactive amine catalysts.

The use of undesired metal such as tin or mercury being part of catalysts may be avoided to some extend, even may be completely avoided.

The polyurethane material according to the present invention may be a rigid, semi-flexible or flexible foam. The polyurethane material may also be thermoplastic polyurethane material, an elastomeric polyurethane. The polyurethane material may also be a polyurethane coating.

The independent and dependent claims set out particular and preferred features of the invention. Features from the dependent claims may be combined with features of the independent or other dependent claims as appropriate.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention.

DETAILED DESCRIPTION OF THE INVENTION

The present invention will be described with respect to particular embodiments. It is to be noticed that the term "comprising", used in the claims, should not be interpreted as being restricted to the means listed thereafter; it does not exclude other elements or steps. It is thus to be interpreted as specifying the presence of the stated features, steps or components as referred to, but does not preclude the presence or addition of one or more other features, steps or components, or groups thereof. Thus, the scope of the expression "a device comprising means A and B" should not be limited to devices consisting only of components A and B. It means that with respect to the present invention, the only relevant components of the device are A and B. Throughout this specification, reference to "one embodiment" or "an embodiment" are made. Such references indicate that a particular feature, described in relation to the embodiment is included in at least one embodiment of the present invention. Thus, appearances of the phrases "in one embodiment" or "in an embodiment" in various places throughout this specification are not necessarily all referring to the same embodiment, though they could. Furthermore, the particular features or characteristics may be combined in any suitable manner in one or more embodiments, as would be apparent to one of ordinary skill in the art.

The following terms are provided solely to aid in the understanding of the invention.

Potlife=Time required for the viscosity of a reactive mixture to reach twice its original value.

Gel time=Time from when the reactive mixture begins to soften until gelation; the irreversible transformation of the reactive mixture from a viscous liquid to an elastic gel. Experimentally this is measured by dynamic rheometry and is the time to reach the point where the loss and storage modulus are equal.

Figure 1:
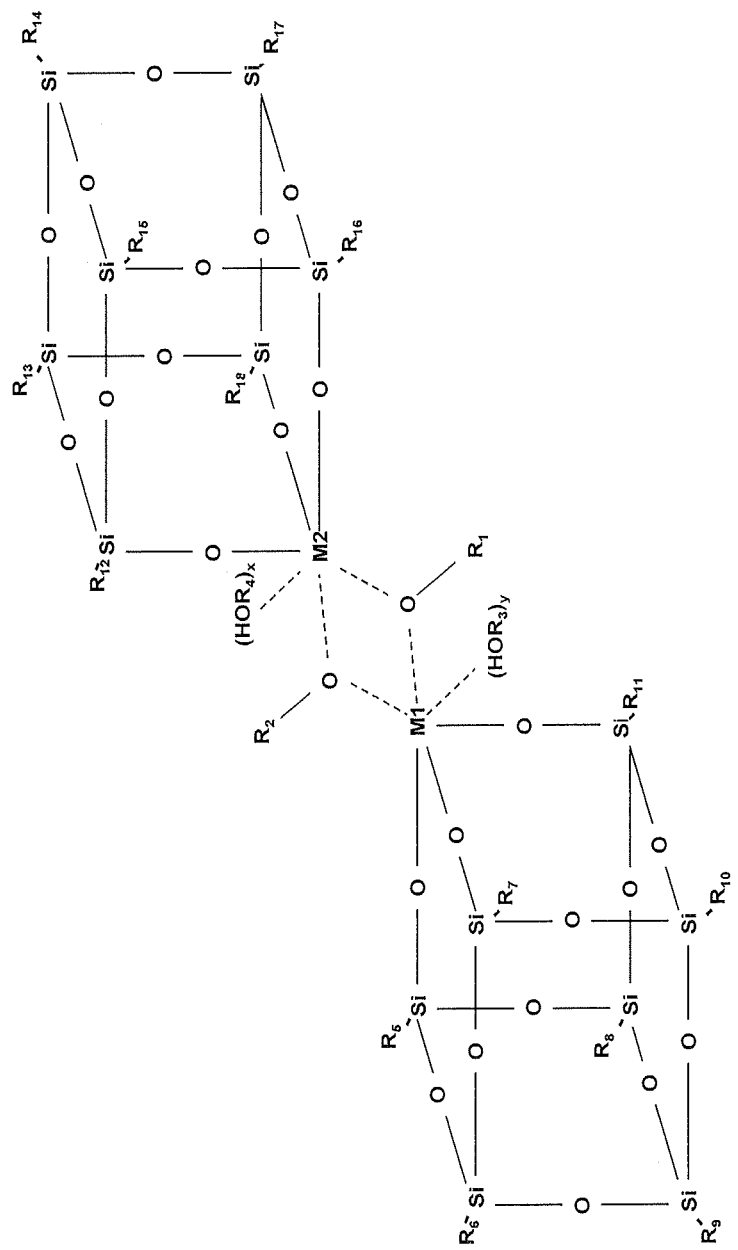
FIG. 1 is a schematic view of a POMS

In order to enable the invention to be explained, in the examples described hereinafter, reference may be made to the schematic view of POMS as shown in FIG. 1.

Figure 2A:
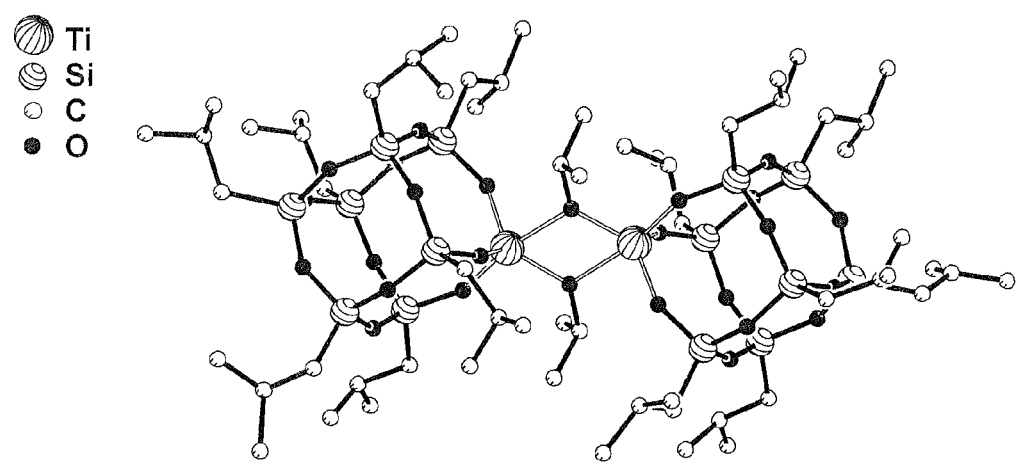
FIG. 2A is a schematic view of an X-ray structure of Ti-POMS(1).
Figure 2B:
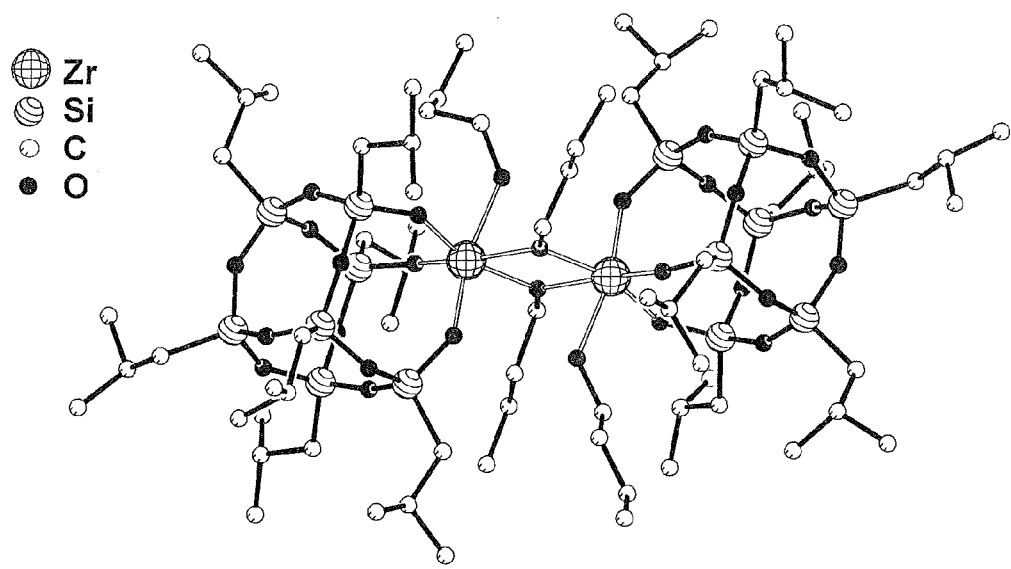
FIG. 2B is a schematic view of an X-ray structure of Zr-POMS, suitable for use in a method according to the first aspect of the present invention.

Depending on the POMS the following references are used in combination with FIG. 1:

Each of x and y may be 0 or 1
Each of M1 and M2 may be Ti or Zr
Each of $R_1$ and $R_2$ may be an alkyl group.
Each of $R_3$ and $R_4$ may be an alkyl group, a polyether or a polyester.
Each of $R_5$ to $R_{18}$ may be an alkyl group, a polyether or a polyester.
When reference is made to Ti-POMS(1), the references are x, y=0
M1, M2=Ti
$R_1$, $R_2$=i-propyl
$R_5$ to $R_{18}$=i-butyl
As x and y are 0, no $R_3$ and $R_4$ are present
When reference is made to Ti-POMS(2), the references are x, y=0
M1, M2=Ti
$R_1$, $R_2$=i-propyl
$R_5$ to $R_{18}$=i-octyl
As x and y are 0, no $R_3$ and $R_4$ are present
When reference is made to Zr-POMS, the references are x, y=1
M1, M2=Zr
$R_1$ to $R_4$=n-butyl
$R_5$–$R_{18}$=i-butyl In a first experiment, a method according to the present invention is compared with a method using a known POMS. In particular the Ti-POMS(1) of FIG. 2A and the Zr-POMS of FIG. 2B have been used. The Ti-POMS(1) comprises two metal atoms Titanium at oxidation state +4. The 5-coordinated metal centers are bridged by two isopropoxides and both metals contain a terdentate polyhedral oligomeric silsesquioxane ligand. In FIG. 2B, the x-ray structure of a Zr-POMS is shown. The Zr-POMS comprises two metal atoms Zirkonium at oxidation state +4. The 6-coordinated metal centers are bridged by two n-butoxides and both metals contain a terdentate polyhedral oligomeric silsesquioxane ligand. Two additional n-butanol ligands are present in the Zr-POMS, one ligand coordinated to each of the Zr-atoms.

In this first experiment, it is shown that elevated temperatures are necessary to activate the Zr-POMS catalyst in a method according to the present invention, whereas in a comparative example, the reaction proceeds at ambient temperature when the Ti-POMS(1) is used as a catalyst.

The studied reaction in this case is between PhNCO and nBuOH in toluene at 20° C. at a molar ratio of PhNCO:nBuOH:Ti-POMS of 1000:1000:1 and a concentration of PhNCO of 0.1M.

In a first test the pristine Ti-POMS(1) was dissolved in toluene together with the other components of the reactive composition.

In a second test the Ti-POMS(2) was first blended into a trifunctional polyol (hereinafter polyol(1), being ethylene oxide/propylene oxide block copolymer, OH value=28 mg KOH/g and ethylene oxide content=15.2 wt %) at 7.5 wt % (ie. weight Ti-POMS(2) to weight polyol(2)), prior to blending of this Ti-POMS(2) catalyst solution with the other components of the reactive composition.

Ti-POMS(1) or Ti-POMS(2) are able to exchange the remaining coordination positions with alcohols, rapidly at 20° C. whereas with Zr-POMS this only occurs at elevated temperatures. The exchange at room temperature for Zr-POMS is much slower.

Figure 3:
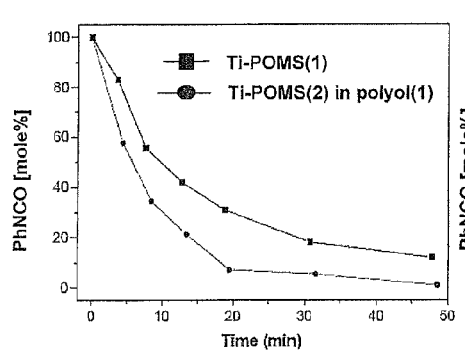
FIGS. 3 and 4 show the conversion of isocyanate into a urethane in a reactive composition when a conventional method (FIG. 3) or a method according to the present invention (FIG. 4) is used.
Figure 4:
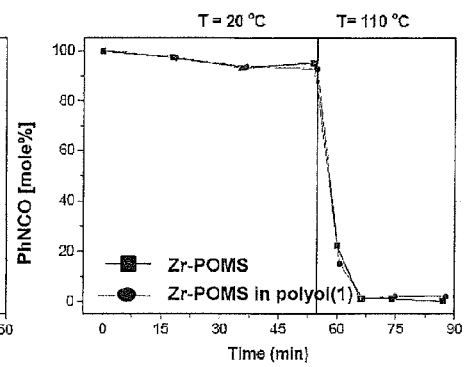

The graphs shown in FIGS. 3 and 4, show the relative reduction of PhNCO on a molar basis in the reactive composition during forming of the urethane, PhNCO being converted into a urethane, PhNHCOOnBu.

In the graphs of FIG. 3, the reactivity of Ti-POMS(1) and Ti-POMS(2) at 20° C. are shown. One of the graphs is the Ti-POMS(1) catalyst of FIG. 2A dissolved in toluene. The other graph is the Ti-POMS(2) catalyst firstly dissolved in polyol(1), and basically the reactivity rate is similar.

The graph of FIG. 4 shows the relative reduction of PhNCO when the Zr-POMS of FIG. 2B is used as catalyst. When the temperature was kept at 20° C. (period 0 to 52 minutes on the time scale in abscissa) only a very low PhNCO conversion was measured, indicating that the catalytic reaction of the Zr-POMS is very low. After 52 min, the temperature was brought to 110° C. It is clear that at 20° C. the reaction hardly proceeds whereas the reaction rate is high at 110° C.

Figure 5:
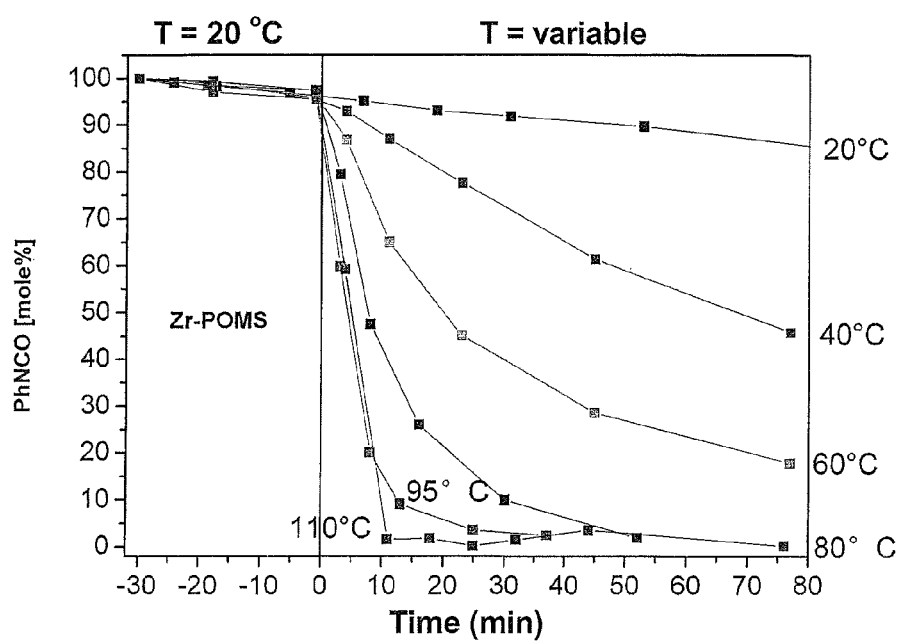
FIG. 5 shows the conversion of isocyanate into an urethane in a reactive composition using different reaction temperatures for a method according to the present invention.

The graph in FIG. 5, shows the PhNCO decrease for the same system, i.e. Zr-POMS dissolved in toluene together with PhNCO and nBuOH but bringing the temperature (at time indicated zero) from 20° C. to a temperature $T_{reaction}$ between 20 and 110° C. There is a gradual increase in reactivity of the Zr-POMS for increasing $T_{reaction}$.

Figure 6:
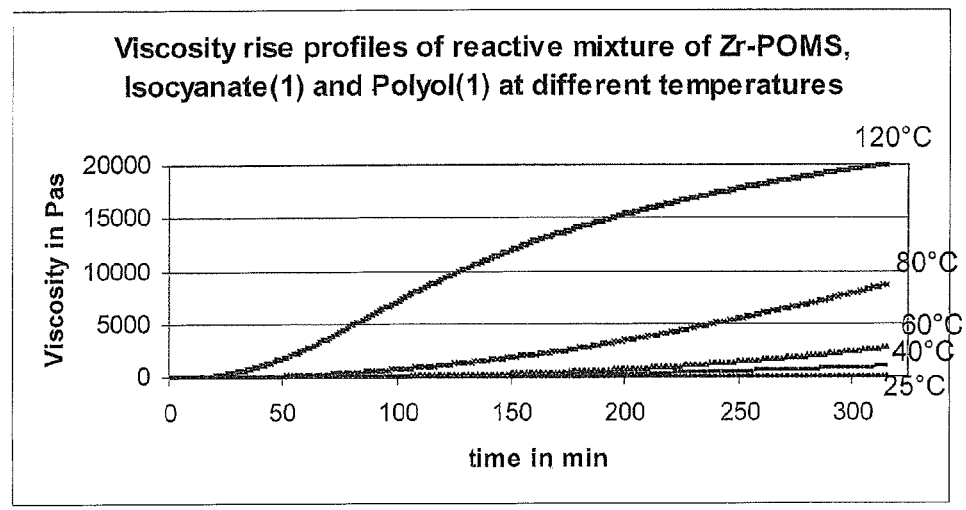
FIG. 6 shows the increase of viscosity during reaction into a polyurethane material of a reactive composition according to the second aspect of the present invention.
Figure 6A:
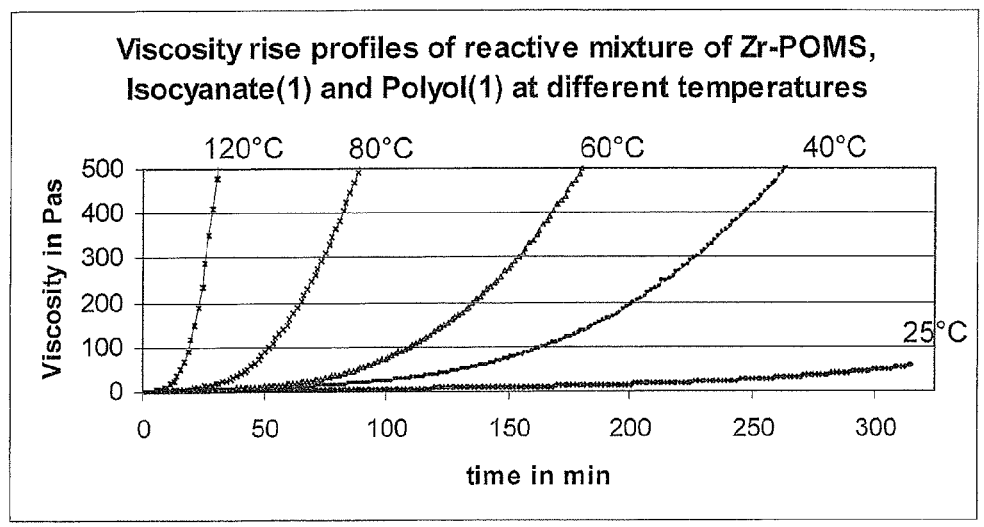
FIG. 6A shows an enlargement (with respect to the y-axis) of FIG. 6.

In a second experiment a similar behavior of the Zr-POMS catalyst, as shown in FIGS. 6 and 6A, is observed when the Zr-POMS of FIG. 2B is used in a reactive composition suitable to provide polyurethane upon reaction, the reactive composition comprising an MDI based prepolymer and polyol(1). An equimolar amount (based on NCO and Hydroxyl groups) of MDI based prepolymer to polyol(1) is used. The concentration of Zr-POMS is 0.35 mM. The MDI based prepolymer has the following properties: NCO functionality=2.15, NCO value=25.6 wt %, di-isocyanate content=62.3 wt %, tri-isocyanate content=5.4 wt %, polyisocyanate content=8.9 wt %. The polyol in this prepolymer is a 50/50 wt % mix of a difunctional random polyol of ethylene oxide and propylene oxide (OH value=30 mg KOH/g, ethylene oxide content=14.3 wt %) and a difunctional block copolymer of ethylene oxide and propylene oxide (OH value=42 mg KOH/g, ethylene oxide content=76.0 wt %).

The reactive composition is made and kept at a $T_{reaction}$ being chosen between 20° C. and 200° C. In the graph in FIGS. 6 and 6A, for various $T_{reaction}$, the viscosity as a function of time which corresponds to the conversion of the isocyanate and isocyanate reactive components into a polyurethane is shown. It can be seen that for a $T_{reaction}$ of 25° C., the system hardly converts whereas with increasing $T_{reaction}$ the rate increases steadily by increasing $T_{reaction}$.

Figure 7:
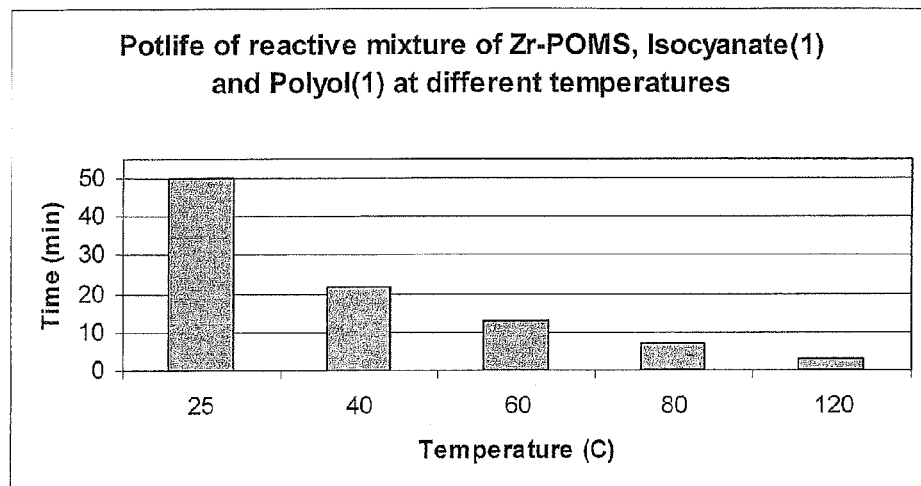
FIGS. 7 and 8 show the potlife and the geltime of the reactive composition according to the second aspect of the present invention, used for the reaction being subject of FIG. 6.
Figure 8:
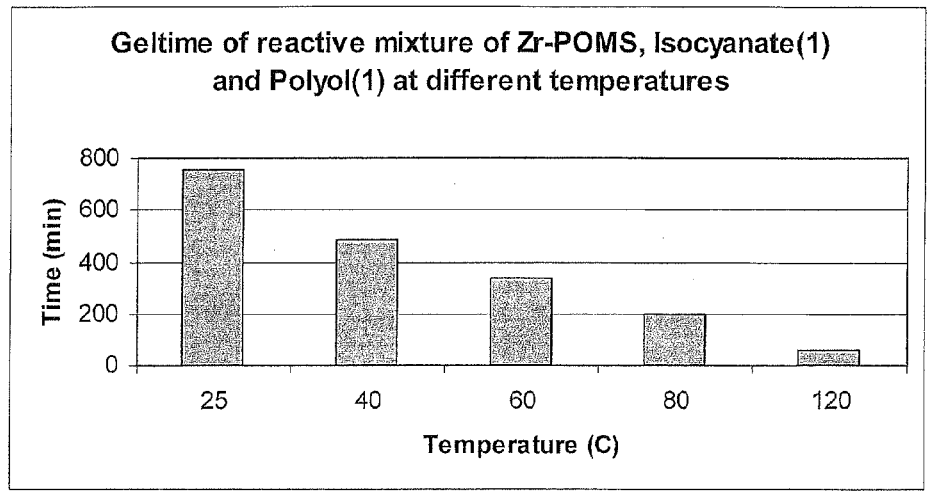

This second experiment was monitored with a Haake Rheostress device in oscillation mode with a plate/plate geometry (alumina, diameter=2 cm, gap=1 mm and frequency=1 Hz). From this second experiment the potlife and the geltime according to the definitions can be derived which are shown in FIGS. 7 and 8. The material obtained in the second experiment is a solid elastomeric polyurethane material.

As a comparison, the potlife at 25° C. for the same system using Ti-POMS(2) at the same concentration is less than one minute. The gel time for this reactive composition comprising the Ti-POMS(2) is 36 minutes at 25° C. and 14 minutes at 40° C. respectively. The potlife and geltime above these temperatures are too short to measure.

It is to be understood that although preferred embodiments and/or materials have been discussed for providing embodiments according to the present invention, various modifications or changes may be made without departing from the scope and spirit of this invention.

The invention claimed is:

1. A method to form a urethane material, the method comprises the steps of:
providing at least one isocyanate;
providing at least one isocyanate reactive compound;
providing a metallized polyhedral oligomeric silsesquioxane wherein the metallized polyhedral oligomeric silsesquioxane is different from the at least one isocyanate reactive compound;
blending and reacting said at least one isocyanate, at least one isocyanate reactive compound and said metallized polyhedral oligomeric silsesquioxane to provide said urethane material,
wherein said metallized polyhedral oligomeric silsesquioxane is a dimeric structure with general formula

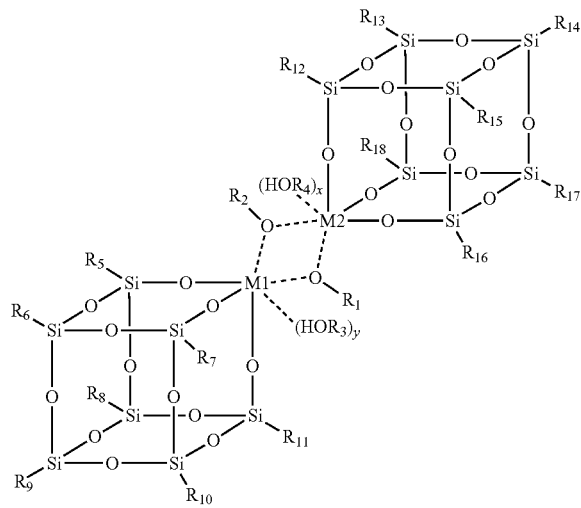

wherein
M1 and M2 represent a metal providing a 6-coordinated metal center;
x=1;
y=1;
$R_1O$ and $R_2O$ each independently represent an alkoxide bridging said 6-coordinated metal centers;
$R_3OH$ and $R_4OH$ each independently represent an alcohol ligand
Each of $R_5$, $R_6$, $R_7$, $R_8$, $R_9$, $R_{10}$, $R_{11}$, $R_{12}$, $R_{13}$, $R_{14}$, $R_{15}$, $R_{16}$, $R_{17}$, $R_{18}$ is selected from the group consisting of alkyl ligands.

2. The method according to claim 1, wherein said metallized polyhedral oligomeric silsesquioxane is incorporated into an isocyanate reactive compound before blending said at least one isocyanate, at least one isocyanate reactive compound and said metallized polyhedral oligomeric silsesquioxane.

3. The method according to claim 1, wherein the blending of said at least one isocyanate, at least one isocyanate reactive compound and said metallized polyhedral oligomeric silsesquioxane is done at a temperature between −10° C. and 25° C.

4. The method according to claim 1, wherein the blend of said at least one isocyanate, at least one isocyanate reactive compound and said metallized polyhedral oligomeric silsesquioxane is brought to a temperature between 25° C. and 200° C. to initiate the reaction of said at least one isocyanate, at least one isocyanate reactive compound and said metallized polyhedral oligomeric silsesquioxane.

5. The method according to claim 1, wherein the metal is zirconium.

6. The method according to claim 1, wherein the urethane material is a polyurethane material.

7. The method according to claim 6, wherein at least one gelling catalyst is provided to the blend of said at least one isocyanate, at least one isocyanate reactive compound and said metallized polyhedral oligomeric silsesquioxane, and wherein said gelling catalyst is different from said metallized polyhedral oligomeric silsesquioxane.

8. The method according to claim 6, wherein at least one blowing catalyst is provided to the blend of said at least one isocyanate, at least one isocyanate reactive compound and said metallized polyhedral oligomeric silsesquioxane, and wherein said blowing catalyst is different from said metallized polyhedral oligomeric silsesquioxane.

9. The method according to claim 1, wherein the concentration of said metallized polyhedral oligomeric silsesquioxane in the blend of said at least one isocyanate, at least one isocyanate reactive compound, and said metallized polyhedral oligomeric silsesquioxane is less than or equal to 10 mM.

10. A reactive composition, said reactive composition comprises
   at least one isocyanate;
   at least one isocyanate reactive compound;
   a metallized polyhedral oligomeric silsesquioxane wherein the metallized polyhedral oligomeric silsesquioxane is different from the at least one isocyanate reactive compound;
   wherein said metallized polyhedral oligomeric silsesquioxane is a dimeric structure with general formula

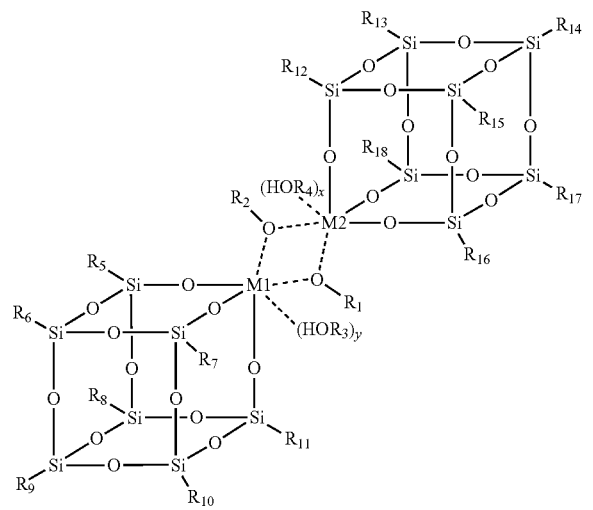

wherein
M1 and M2 represent a metal providing a 6-coordinated metal center;
x=1,
y=1;
$R_1O$ and $R_2O$ each independently represent an alkoxide bridging said 6-coordinated metal centers;
$R_3OH$ and $R_4OH$ each independently represent an alcohol ligand
Each of $R_5$, $R_6$, $R_7$, $R_8$, $R_9$, $R_{10}$, $R_{11}$, $R_{12}$, $R_{13}$, $R_{14}$, $R_{15}$, $R_{16}$, $R_{17}$, $R_{18}$ is selected from the group consisting of alkyl ligands.

11. The reactive composition according to claim 10, wherein the metal is zirconium.

12. A polyurethane material made by the method comprising the steps of;
   providing at least one isocyanate;
   providing at least one isocyanate reactive compound;
   providing a metallized polyhedral oligomeric silsesquioxane wherein the metallized polyhedral oligomeric silsesquioxane is different from the at least one isocyanate reactive compound;
   blending and reacting said at least one isocyanate, at least one isocyanate reactive compound and said metallized polyhedral oligomeric silsesquioxane to provide said urethane material,
   wherein said metallized polyhedral oligomeric silsesquioxane is a dimeric structure with general formula

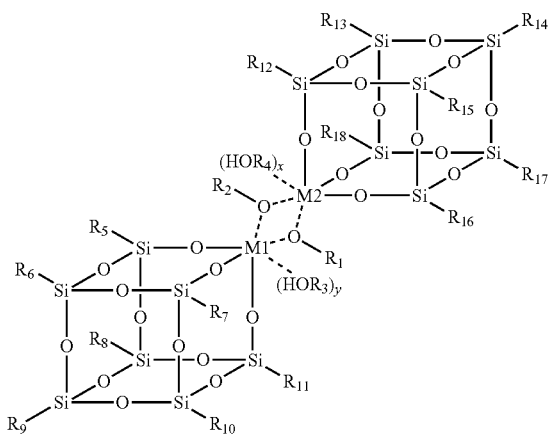

wherein
M1 and M2 represent a metal providing a 6-coordinated metal center;
x=1;
u=1;
$R_1O$ and $R_2O$ each independently represent an alkoxide bridging said 6-coordinated metal centers;
$R_3OH$ and $R_4OH$ each independently represent an alcohol ligand
Each of $R_5$, $R_6$, $R_7$, $R_8$, $R_9$, $R_{10}$, $R_{11}$, $R_{12}$, $R_{13}$, $R_{14}$, $R_{15}$, $R_{16}$, $R_{17}$, $R_{18}$ is selected from the group consisting of alkyl ligands.

* * * * *